June 18, 1968 R. W. HILTON 3,388,579
METHOD AND APPARATUS FOR FABRICATING CELLULAR LOAD
BEARING PLANKS INVOLVING IMPACT EXTRUSION
OF FLAT CELLULAR SLABS
Filed Oct. 18, 1965 2 Sheets-Sheet 1
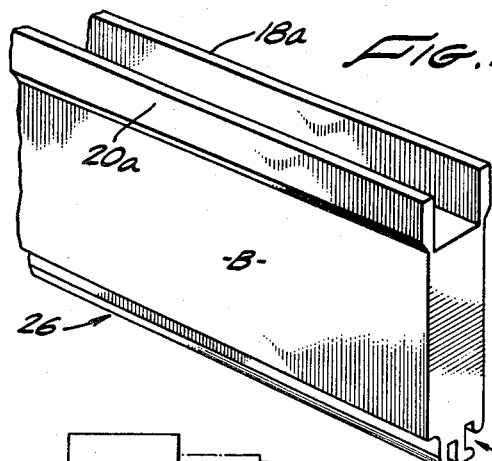
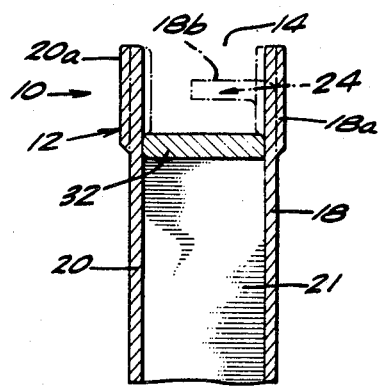
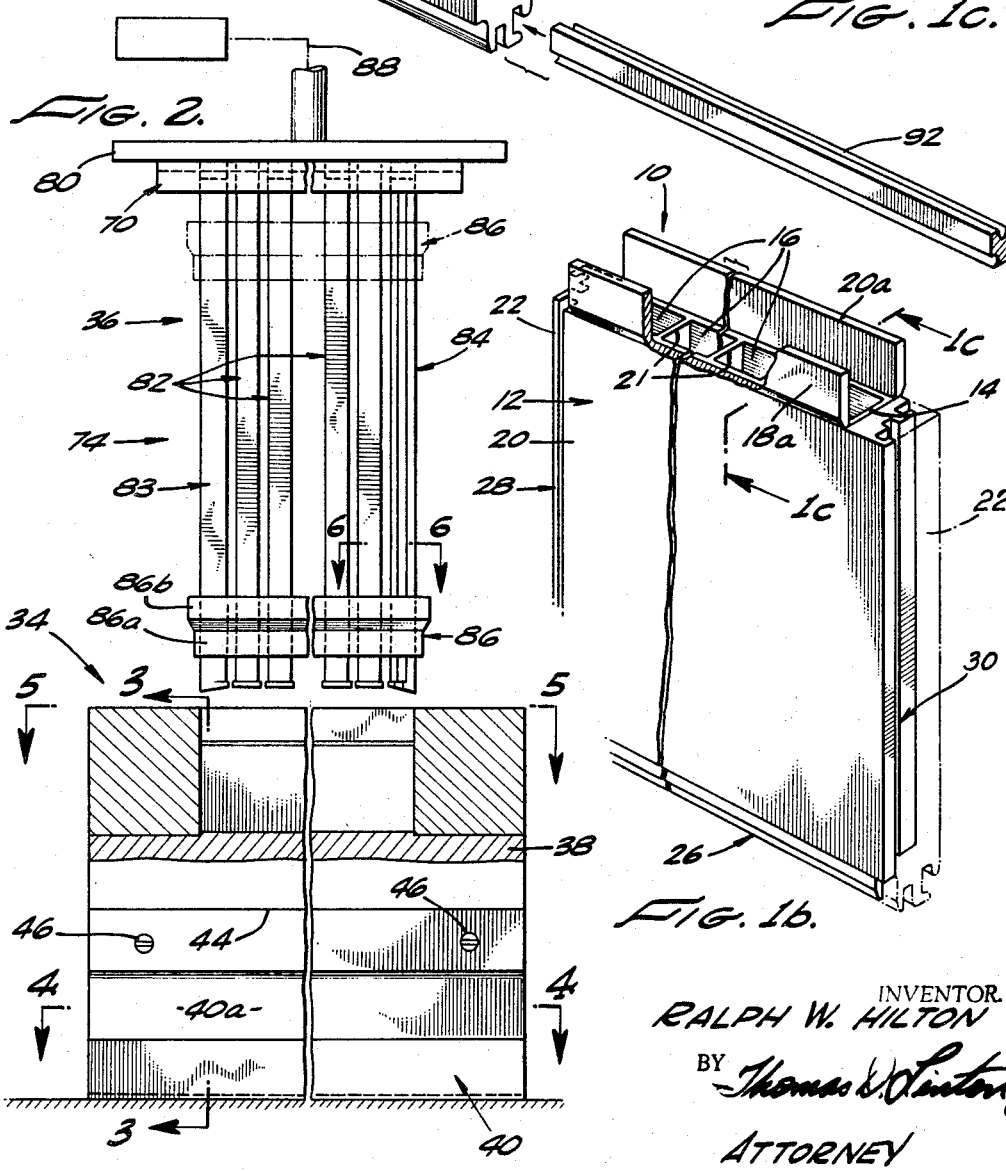
INVENTOR.
RALPH W. HILTON
BY Thomas W. Linton Jr.
ATTORNEY INVENTOR.
RALPH W. HILTON
BY
Thomas W. Linton Jr.
ATTORNEY

United States Patent Office 3,388,579
Patented June 18, 1968

3,388,579
METHOD AND APPARATUS FOR FABRICATING CELLULAR LOAD BEARING PLANKS INVOLVING IMPACT EXTRUSION OF FLAT CELLULAR SLABS
Ralph W. Hilton, Torrance, Calif., assignor to Harvey Aluminum (Incorporated), Torrance, Calif., a corporation of California
Filed Oct. 18, 1965, Ser. No. 496,935
8 Claims. (Cl. 72—256)

ABSTRACT OF THE DISCLOSURE

Load bearing planks are fabricated from a billet of extrusible material by first forming an undercut connector means along the bottom edge of billet, inserting said bottom edge in contact with a portion of the closed end of an extrusion die cavity, inserting intermediate the said connecting means of the billet and the closed end of the die cavity a forming bar to prevent distortion of the undercut connector means during the subsequent backward extrusion of the billet.

---

This invention relates generally to the art of working extrusible materials and has more particular reference to a method of and apparatus for extruding flat shapes, such as rectangular cellular planks adapted for side and end connection to other similar planks to form a modular load bearing platform.

Load bearing platforms of the character described are designed for placement over relatively soft, uneven, or otherwise adverse terrain to facilitate vehicular movement thereacross. Platforms of this type are used, for example, as aircraft landing mats to provide temporary aircraft runways over terrain which would otherwise be unsuitable for aircraft landings and takeoffs.

A wide variety of such load bearing platforms have been devised. Copending application Ser. No. 476,693, filed Aug. 10, 1965, and entitled Plank for Modular Load Bearing Surfaces Such As Aircraft Landing Mats, now abandoned, discloses a platform module, known as a plank, which is adapted for side and end connection to other similar planks to form a modular load bearing platform. The principal, though not sole, use of this platform is as an aircraft landing mat. Briefly, the plank disclosed in the latter application comprises a rectangular cellular metal slab having generally flat and parallel side walls and intervening cells defining therebetween reinforcing ribs extending parallel to the ends of the slab. These cells are open at only one side edge of the slab. Along the side and end edges of the slab are side and end connecting means, respectively, for joining the slab to other similar slabs. The entire slab, including its side walls, ribs, and edge connecting means, comprises an integral unitary structure formed from a single piece of metal. The plank is completed by a wall member which is secured to the open side edge of the plank slab so as to close the adjacent open ends of the cell.

This plank is superior in many respects to prior similar cellular metal planks. Such superiority resides, primarily, in the increased strength and substantially longer life of the plank when the latter is loaded in its intended manner, and particularly when the plank is used in an aircraft landing mat. The superiority of the plank also resides in its complete lack of welded joints or other joints which tend to weaken the plank and/or produce discontinuities in the upper, load bearing surface of a load bearing platform, such as an aircraft landing mat, constructed of a number of the planks.

The present invention is particularly useful for fabricating metal load bearing planks of the kind described above. As will appear from the ensuing description, however, the invention may be employed to fabricate other extended shapes.

Accordingly, it is one object of this invention to provide a novel method of and apparatus for making extruded shapes such as cellular, metal load bearing planks of the character described.

A further object of the invention is to provide an improved impact extrusion die for use in extruding cellular metal slabs of the character described and other extruded shapes, which die is uniquely constructed and arranged to retain the proper shape and dimensions of the die cavity during the extrusion cycle.

Other objects, advantages, and features of the invention will present themselves as the description proceeds.

With these and such objects in view, the invention consists in the construction, arrangement, and combination of parts of the invention, whereby the objects contemplated are obtained as hereinafter set forth, pointed out in the appended claims, and illustrated in the attached drawings.

In these drawings:

FIG. 1a is a fragmentary perspective view of a billet of extrusible material which is employed in the present extrusion method and apparatus;

FIG. 1b is a fragmentary perspective view of an extruded cellular slab produced by the present method and apparatus, with the slab broken away to illustrate the internal cellular structure thereof;

FIG. 1c is a section taken on line 1c—1c of FIG. 1b illustrating a wall member in place for closing the open ends of the slab cells and a final step in the present method of fabricating a cellular load bearing plank;

FIG. 2 is a side elevation of impact extrusion apparatus for extending the cellular slab of FIG. 1b including the improved extrusion die of the invention;

Figure 3:
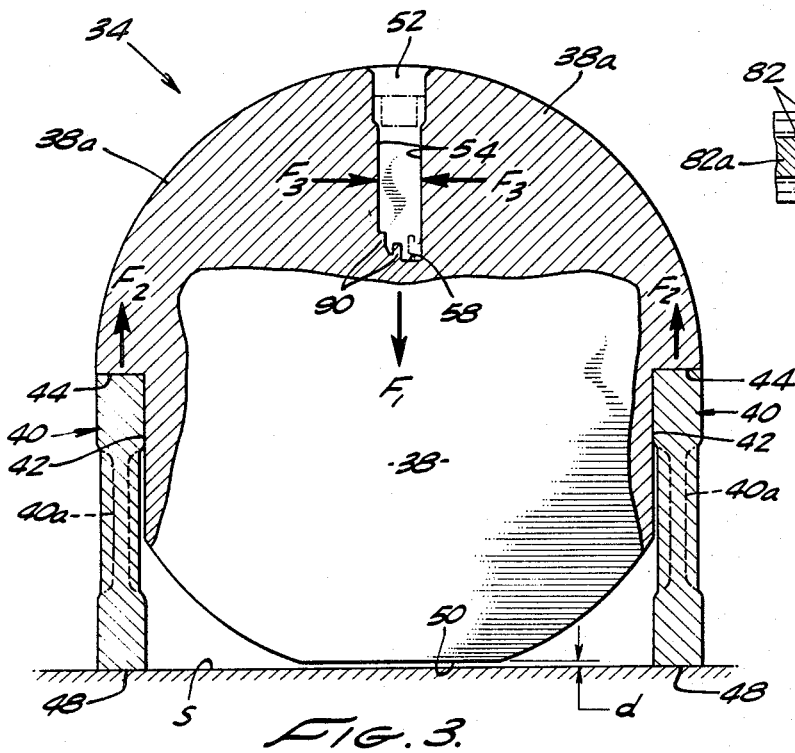
FIG. 3 is a vertical section through the extrusion die, taken on line 3—3 in FIG. 2.
Figure 6:
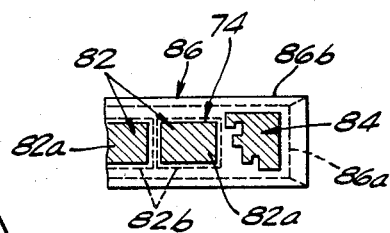
Figure 4:
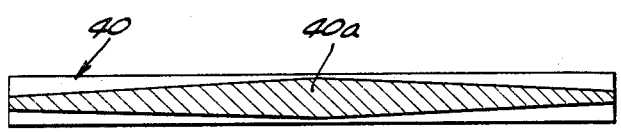
FIG. 4 is a horizontal section through a supporting member for the extrusion die, taken on line 4—4 in FIG. 2.
Figure 7:
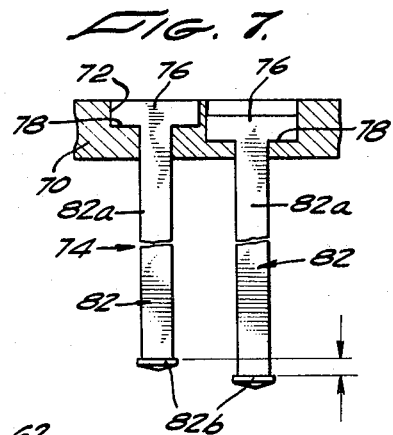
Figure 5:
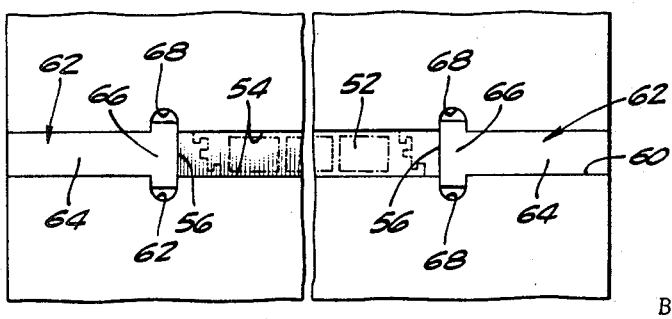
FIG. 5 is a fragmentary plan view of the extrusion die cavity taken on line 5—5 in FIG. 2.

FIG 6 is a horizontal section through certain extrusion punches of the present extrusion apparatus, taken on line 6—6 in FIG. 2; and FIG. 7 is an enlarged fragmentary side elevation of the upper supporting structure for the extrusion punches, partially broken away to illustrate the manner in which alternate punches are permitted to float endwise in order to facilitate extraction of the punches from the extruded cellular slab.

FIGS. 1b and 1c illustrate the cellular plank 10 of the aforementioned copending application and which the fabricating method and apparatus of this invention are designed to produce. Plank 10 comprises a rectangular metal slab 12 which is constructed of a suitable extrusible material, such as aluminum. Extending into one longitudinal side edge 14 of the slab are a number of spaced parallel cells 16 of rectangular shape in transverse cross section. These cells extend only part way through the slab, in a common plane between and parallel to the normally upper and lower walls 18 and 20, respectively, of the slab, thereby to define reinforcing ribs 21 between the cells and integral edge walls along the end edges 22 and the remaining side edge 14 of the slab. Along the side edges 14 of the slab are complementary side connecting means 24 and 26, respectively, for releasably joining a number of the slabs in side-by-side relation. Along the end edges 22 of the slab are complementary end connecting means 28 and 30, respectively, for releasably joining a number of the slabs in end-to-end relation. As will appear shortly, the invention is not directly concerned with the side connecting means 26 and the end connecting means 28 and 30, which may be formed in various ways. The invention, however, is concerned to some extent with the remaining side connecting means 24 and its method of fabrication. This latter side connecting means comprises extending edge portions 18a, 20a of the slab side walls 18 and 20, respectively, edge portion 18a being turned, as shown, to form a lip 18b. The adjacent open ends of the cells 16 are closed by a fixed wall member 32.

According to the present method of fabricating the plank 10, a billet B of extrusible material, such as aluminum, is initially formed to the shape illustrated in FIG. 1a. This billet has the extending wall portions 18a, 20a and the side connecting means 26 formed thereon, although as far as the invention is concerned, this connecting means may be later machined or otherwise formed. Billet B may be fabricated in various ways, as by extruding it endwise to the illustrated shape. In the second step of the present method, the billet B is extruded to form the cellular extrusion or slab 12 in FIG. 1b. This extruded slab has the upper and lower walls 18, 20, intervening alternate cells 16 and reinforcing ribs 21, side connecting means 26, end connecting means 28, 30, and extending wall edge portions 18a, 20a referred to above. During the final step of the present plank fabricating method, the wall member 32 is installed between the extending wall edge portions 18a, 20a, the edge portion 18a is bent to form the lip 18b, and the edge portions 18a, 18b are pressed inwardly to clamp the wall member 32 in place.

Reference is now made to FIGS. 2–7 illustrating impact extrusion apparatus for extruding the cellular slab 12. This extrusion apparatus includes an improved extrusion die 34 according to the invention and an extrusion punch assembly 36 which cooperates with the die.

Extrusion die 34 comprises a relatively massive metal bar 38 which is preferably, though not necessarily, of cylindrical shape in transverse cross section for reasons which will be explained presently. The extrusion die bar 38 is supported by a pair of metal supporting members or plates 40. These supporting plates are substantially coextensive with and extend lengthwise of the die bar along opposite sides thereof. Each side of the die bar 38 is milled or otherwise machined, as shown, to form a longitudinally extending recess for receiving the upper edge portion of the adjacent supporting plate 40. Each such plate receiving recess has a vertical side wall 42 against which seats the inner surface of the respective supporting plate and an upper, horizontal, downwardly presented surface or shoulder 44 against which seats the upper edge of the respective supporting plate. The supporting plates 40 are rigidly secured to the die bar 38 in any convenient way, as by screws 46.

The lower side edges 48 of the supporting plates 40 are located in a common plane parallel to the longitudinal axis of the die bar 38. The undersurface of the die bar is machined to form on the bar a flat face 50 disposed in a plane parallel to the common plane of the lower edge faces 48 of the supporting plates 40. For reasons to be explained presently, the lower die bar face 50 is vertically spaced a distance $d$ above the common plane of the lower supporting plate edge faces 48.

Extending into the upper side of the die bar 38, in a plane normal to the lower die bar face 50 and containing the longitudinal axis of the die bar 38 is a generally rectangular extrusion die cavity 52. This die cavity has spaced, parallel vertical side walls 54, spaced parallel vertical end walls 56, and a bottom wall 58. Die cavity 52 may be formed in various ways. According to the preferred practice of the invention, however, the cavity is formed by machining a slot 60, having a width and depth equal to the desired width and depth, respectively, of the cavity, from one end of the die bar to the other. Inserts 62 are then placed in the ends of the slot 60 to form the end walls 56 of the die cavity 52. These inserts are generally T-shaped in plan view and have flat plate-like sections 64 which fit in the die bar slot 60 proper and transverse sections 66 at one end of the plate sections 64, respectively. The protruding ends of these transverse sections of the inserts fit in cross slots 68 extending into the upper side of the die bar 38 and opening into the die bar slot 60. It is evident, therefore, that the die bar inserts 62 are keyed in position.

The extrusion punch assembly 36 comprises a punch mounting bar, a cross head 70 having vertical openings 72 extending therethrough. Extending through these openings and depending below the cross heads are extrusion punches 74. The upper ends of the punches have external flanges 76 which engage internal shoulders 78 about the cross head openings 72 to restrain the punches against downward endwise movement relative to the cross head 70. A retaining plate 80 is bolted or otherwise secured to the upper surface of the cross head to restrain the punches against upward endwise movement relative to the cross head.

Extrusion punches 74 are uniformly spaced along the cross head 70 and include a set of intermediate punches 82 and two outer or end punches 83 and 84. The intermediate punches 82 are identical and each has a rectangular shank 82a and a rectangular extrusion flange 82b on the lower end of the shank. Punches 82 are disposed with their confronting faces in parallel planes normal to the punch cross head 70. The two outer punches 83 and 84 have similar but reversed cross-sectional configurations complementing the cross-sectional configurations of the end connecting means 28 and 30, respectively, on the plank 10. The punch-receiving openings 72 in the cross head 70 are rectangular so as to restrain the punches 74 against turning on their longitudinal axes.

Slidably mounted on the extrusion punches 74 is a combined locator and stripper bar 86. This bar has rectangular openings slidably receiving the punch shanks. The lower edge portion 86a of the locator and stripper bar 86 is dimensioned to fit slidably in the upper end of the extrusion die cavity 52. The upper edge portion of the bar is somewhat larger in its dimensions than the lower edge portion, as shown.

Drive means 88 are provided for driving the punch assembly 36 toward and away from the extrusion die 34 along direction lines parallel to the longitudinal axis of the extrusion punches 74 and parallel to the side and end walls of the extrusion die cavity 52. The punch assembly is movable toward the die to a position wherein the lower edge portion 86a of the locator and stripper bar 86 fits in the upper end of the extrusion die cavity 52 and the extrusion punches 74 extend into the cavity to a position in which the leading ends of the punches are spaced a predetermined distance from the bottom wall 58 to the cavity. The locator and stripper bar 86 locates the leading ends of the punches in accurately centered relation between the die cavity side walls 54 and in uniformly spaced relation endwise of the die cavity. The extrusion flanges 82b on the punches are narrower, by a predetermined amount, than the die cavity so that an extrusion space or opening surrounds each punch.

In operation of the extrusion apparatus, the extrusion die 34 is supported on a suitable supporting surface S in proper vertical alignment with the extrusion punch assembly 36. The billet B is then placed in the die cavity 52 with the connecting means 26 on the billet lowermost. A suitable formation 90 on the bottom wall 58 of the die cavity and a hard forming bar 92 inserted endwise into the undercut groove of the connecting means 26 together constitute a forming means which retain the shape of the latter connecting means during the extrusion cycle.

During the course of this cycle, the extrusion punches 74 are driven, by the means 88, downwardly into the die cavity 52. Eventually these punches encounter the billet B in the cavity and penetrate the billet, thereby displacing the extrusible material of the billet upwardly in the cavity and through the extrusion space or opening which surrounds each punch. Eventually this displaced material reaches the locator and stripper bar 86 and elevates the latter from the die cavity and upwardly along the punches. When the extrusion punches have descended to their lower limiting position in the die cavity, the punch assembly 36 is retracted upwardly from the cavity and the extruded part, which comprises the cellular slab 12, is removed. The plank 10 is then completed by removing the forming bar 92, inserting the wall member 32 between the extending edge portions 18a, 20a of the extruded slab, pressing these edge portions inwardly toward one another, as indicated in phantom lines in FIG. 1c, to secure the wall member in position, and bending the edge portion 18a to its dashed line position of the latter figure to form the lip 18b. The finished plank 10 is adapted for side and end connection to other similar planks, in the manner explained in the aforementioned co-pending application, to provide an extended load bearing surface.

In order to facilitate extraction of the extrusion punches 74 from the extruded slab 12, alternate punch receiving openings 72 in the punch assembly cross head 70 may be axially dimensioned to permit the respective punches to float a limited distance in the axial direction, as shown in FIG. 7. Thus, when the punches are extracted from the extruded slab, alternate punches will drop down below the intervening punches, thus facilitating their removal from the slab.

In connection with the securement of the wall member 32 in position, attention is directed to the fact that the extending wall portions 18a, 20a of the billet B project somewhat beyond the sides of the billet, as shown in FIG. 1a, and to the fact that the die cavity 52 is shaped in vertical transverse section to accommodate these projecting edge portions. When the edge portions are subsequently pressed inwardly to clamp the wall member 32 in position, as described above and shown in FIG. 1c, these edge portions are displaced inwardly to their phantom line positions, wherein their outer surfaces are flush with the outer surfaces of the extruded slab 12. This inward displacement of the edge portions forces the latter over longitudinal edges of the wall member 32, as shown, thereby securely locking the wall member in position.

A highly unique and important feature of the invention resides in the construction of the extrusion die 34. In connection with this die, it is evident that during the extrusion cycle discussed above, the billet material being extruded exerts a force outwardly against each wall of the extrusion space 52. These extrusion forces tend to separate the cavity side walls 54 and thereby increase the width of the cavity. Such wall separation tends to be greatest midway between the ends of the die cavity, whereby the cavity side walls tend to assume an arcuate configuration. It is evident, of course, that this cavity side wall separation, if it occurs, at least to any significant extent, will result in an improperly extruded shape with outwardly bowing walls 18 and 20.

The present improved extrusion die 34 is uniquely designed to resist separation of the die cavity side walls 54 during the extrusion cycle and, thereby, to produce a high quality extruded shape of the desired dimensions and with flat walls 18 and 20. Thus, referring to FIG. 3, it is evident that during the extrusion cycle, the descending extrusion punches 74 produce a downward force $F_1$ on the extrusion die bar 38 in a vertical plane midway between the side supporting plates 40 for the die bar. These supporting plates, in turn, produce upward vertical reaction forces $F_2$ on the die bar shoulders 44. These forces $F_1$ and $F_2$ obviously act in concert to produce generally horizontal, inwardly directed forces $F_3$ on the upper portions 38a of the die bar 38, at opposite sides of the die cavity 52, in opposition to the outward forces exerted on the cavity side walls 54 by the extruding billet material. Thus, the forces $F_3$ resist separation of the cavity side walls during the extrusion cycle. It has been found in actual practice that an extrusion die constructed in accordance with the invention is capable of maintaining the proper die cavity width during the entire extrusion cycle.

It is evident, of course, that the magnitude of the resisting forces $F_3$ required to preserve the proper width of the die cavity 52 along its entire length vary along the cavity. Thus, the resisting forces must be greatest midway between the ends of the cavity and diminish toward the ends of the cavity. According to the present invention, this variation in the resisting forces $F_3$ along the die cavity 52 is accomplished by milling or otherwise machining the supporting plates 40 for the die bar 38, in the manner shown in FIGS. 2, 3 and 4 to provide the plates with web sections 40a which vary in effective thickness from one end of the supporting plates to the other. Thus, these web sections are tapered to have maximum thickness midway between the ends of the die cavity 52, where the greatest resisting forces $F_3$ are required, and to have progressively diminishing thickness toward the ends of the die cavity, where the smallest resisting forces $F_3$ are required. In actual practice, however, the variation in the resisting forces $F_3$ along the die cavity required to maintain the desired die cavity width during an extrusion cycle may dictate supporting plate web sections 40a which vary in effective thickness other than in the tapered fashion illustrated in FIG. 4, depending upon the material being extruded, the shape being extruded, the particular shape and dimensions of the die cavity and the die bar 38 as a whole, and other factors. Accordingly, the tapered web sections 40a of the supporting plates 40 should be regarded as purely illustrative and not limiting of the invention.

It is evident, of course, that under some conditions, the resisting forces $F_3$ on the portions 38a of the die bar 38 might become excessive, and actually force the die cavity side walls 54 inwardly, thereby reducing the width of the die cavity 52. For this reason, the clearance dimension $d$ between the plane of the lower edge faces 48 of the die bar supporting plates 40 and the lower face 50 of the die bar 38 is selected to limit the resisting forces by causing the die bar to bottom on the supporting surface S at some predetermined vertical load on the die bar which gives rise to the maximum resisting forces $F_3$ permitted in a particular extrusion cycle.

Obviously, while the present improved die 34 has been disclosed in connection with the extrusion of a cellular slab, this same die construction may be used to extrude parts of other shapes. Also, while the invention has been disclosed in connection with the extrusion of a cellular slab in which the cells 16 extend only part way through the slab, such cells may be extruded completely through the slab by placing a butt bar of extrusible material in the die cavity below the billet B, in accordance with customary practice in this regard. In this case, of course, the side connecting means 26 along the edge of the finished plank 10 will be provided separately, as, for example, in the same way as the connecting means 24.

While the invention has herein been shown and described in what is presently conceived to be its most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In an extrusion process for the manufacture from a billet of a rectangular load bearing plank having generally flat and parallel side walls and intervening alternate reinforcing ribs and cells extending parallel to end edges of the plank, the steps comprising:
    forming an undercut side connector means along a bottom edge of the billet,
    placing said billet in an extrusion die open at one end and closed at the other by an end wall with at least a portion of the bottom edge of the billet in contact with the closed end of the cavity, placing a forming bar into the undercut configuration between the billet and the closed end of the die cavity, and moving a plurality of linearly positioned extrusion punches into the die cavity and parallel to the side walls thereof to effect backward extrusion of the billet, thereby forming an extrusion having parallel side walls and intervening reinforcing ribs defining cells therebetween which open through one edge of the extrusion.

2. The process of claim 1, wherein punches at opposite ends of the die cavity have complementary cross-sectional configurations for forming complementary shaped end-connectors on opposite ends of the extrusion.

3. The process of claim 1, further characterized in that one of the edge portions extending beyond the open ends of the cells is bent toward the other edge portion to form a lip.

4. An extrusion die comprising:

a metal bar having normally upper and lower surfaces and an extrusion cavity extending into said upper surface for receiving a billet of extrusible material to be extruded through the open upper end of said cavity by an extrusion member driven into said billet through said open end of said cavity, and a pair of supporting members secured to opposite sides of said bar and extending toward said lower surface thereof for supporting said bar on a supporting surface with said supporting members only in contact with said supporting surface, whereby the downward thrust of said extrusion member against said billet during the extrusion cycle causes said supporting members to exert reaction forces on said bar which resist separation of the side walls of said cavity under the force of the billet material being extruded.

5. An extrusion die according to claim 4 wherein:
said die bar is generally circular in transverse cross section.

6. An extrusion die according to claim 4 wherein:
said supporting members have lower, coplanar surfaces for engaging said supporting surface, and
said lower surface of said die bar is vertically spaced a predetermined distance above the plane of said lower engaging surfaces on said members for contact with said supporting surface at a predetermined vertical thrust of said extrusion member against said die bar.

7. An extrusion die according to claim 4 wherein:
said supporting members comprise vertical supporting plates extending endwise of and substantially coextensive with said die bar.

8. An extrusion die according to claim 4 wherein:
said supporting members comprise vertical supporting plates extending endwise of and substantially coextensive with said die bar, and
the effective thickness of said supporting plates vary therealong, thereby to vary the reaction force exerted on said die bar by each supporting plate at different positions along said bar.

References Cited

UNITED STATES PATENTS

| | | | |
|---|---|---|---|
| 2,161,419 | 6/1939 | Kipperman, et al. | 72—267 |
| 2,814,101 | 11/1957 | Prough et al. | 72—359 |
| 3,064,347 | 11/1962 | Hilton | 72—266 |
| 3,167,204 | 1/1965 | Rouse | 220—5 |

CHARLES W. LANHAM, *Primary Examiner.*

L. A. LARSON, *Assistant Examiner.*